United States Patent [19]
Berman et al.

[11] Patent Number: 5,301,408
[45] Date of Patent: Apr. 12, 1994

[54] GARTER SPRING COUPLING RELEASE TOOL

[75] Inventors: Steven Berman, Blue Bell, Pa.; Billy Carlisle, San Antonio, Tex.; John Clark, North Hills; William C. Rogers, Dresher, both of Pa.

[73] Assignee: R & B, Inc., Colmar, Pa.

[21] Appl. No.: 861,132

[22] Filed: Mar. 31, 1992

[51] Int. Cl.⁵ ............................................. B23P 19/04
[52] U.S. Cl. ........................................ 29/237; 285/39; 285/308; 285/318
[58] Field of Search .................. 285/39, 318, 38, 325, 285/308; 29/237

[56] References Cited

U.S. PATENT DOCUMENTS

| | | | |
|---|---|---|---|
| 546,732 | 9/1895 | Desserich | 285/39 X |
| 2,962,688 | 11/1960 | Werner | 285/901 X |
| 4,055,359 | 10/1977 | McWethy | 285/39 |
| 4,927,185 | 5/1990 | McNaughton | 285/39 |
| 5,112,085 | 5/1992 | Bush et al. | 285/39 |

OTHER PUBLICATIONS

Tools & Equipment for the Professional, OTC ® Catalog No. A-91, 1991, p. 48.
Motormite Catalog, Motormite Mfg., Division of R&B, Inc., Jun. 1991, Cover, p. 246 and back.

Primary Examiner—Dave W. Arola
Attorney, Agent, or Firm—Volpe and Koenig

[57] ABSTRACT

One-piece garter spring coupling release tool. The release tool is molded in a single selectively configured shape out of a durable, flexible plastic material such as Elastollan TM S98A available from Elastogran of Germany. The release tool generally comprises a cylindrical body with a slot along its length and a flange on one end. The slot permits the tool to be positioned around a port to which a garter spring coupling is connected; the flange provides an area for gripping the tool to releasably engage the tool with its coupling. The flexible, slotted configuration of the garter spring coupling release tool permits nesting of a four-piece set of such tools within each other to facilitate packaging, storage and retention of the tools as a set.

5 Claims, 4 Drawing Sheets

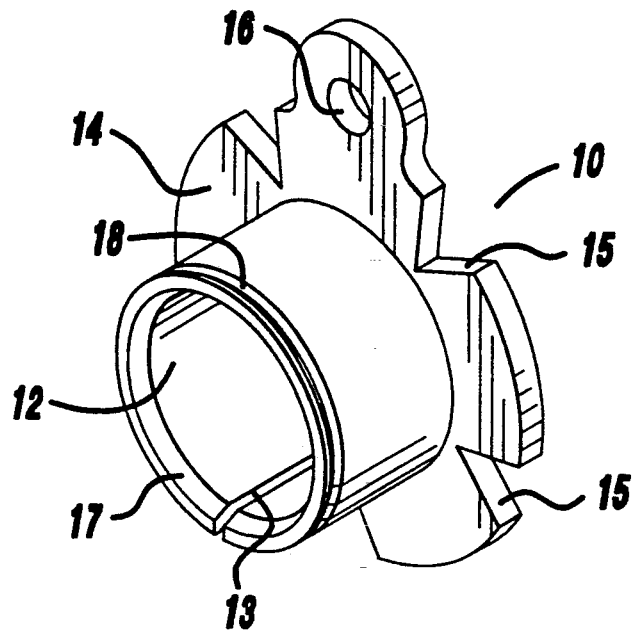
FIG. 1
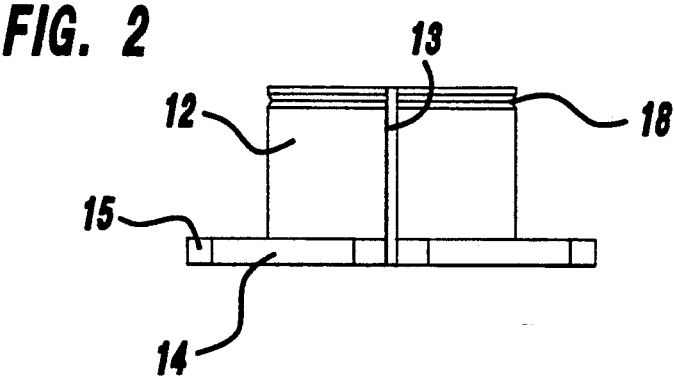
FIG. 2
FIG. 3
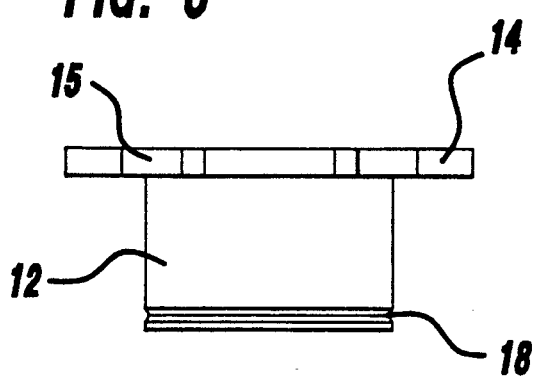
FIG. 4
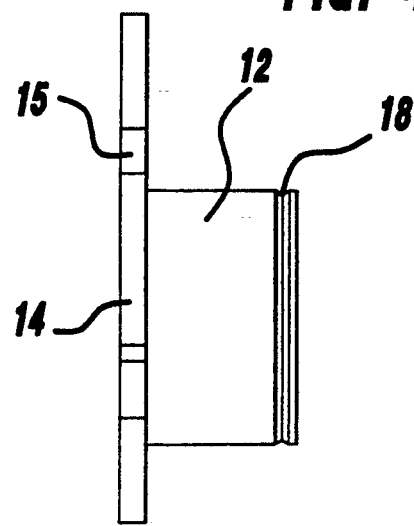

GARTER SPRING COUPLING RELEASE TOOL

This invention relates to a hand tool for releasing a garter spring type hose coupling.

BACKGROUND OF THE INVENTION

A variety of coupling devices exist for connecting hoses to ports. One type of coupling device which is a garter spring coupling device of the type disclosed in U.S. Pat. No. 4,055,359 which patent is incorporated herein by reference as if fully set forth. Such couplings are in widespread use for coupling fluid lines to the compressor or other ports of automobile air-conditioning units.

The port used in conjunction with a garter spring coupling is generally tubular in shape with a flared end. As the coupling is connected, the garter spring radially expands as it passes over the flared end of the port and then contracts around the end of the port to maintain the coupling connected to the port.

To disconnect such garter spring couplings, hand tools have been devised which include rigid semicircular projections which are hinged together. The hinge enables the semicircular projections to be closed about the tubular port in front of the garter spring coupling. The tool is then displaced axially towards the garter spring coupling to radially outwardly expand the garter spring to clear the flared port end. This permits the disconnection of the garter spring coupling from the port. One such prior art tool is disclosed in U.S. Pat. No. 4,055,359.

Although such prior art tools adequately perform their intended function to release such garter spring couplings, applicant has recognized that they are needlessly complex and costly from a manufacturing standpoint due to the necessity of assembling a hinge construction.

SUMMARY AND OBJECTS OF INVENTION

An improved one-piece garter spring coupling release tool is provided. The release tool is molded in a single selectively configured shape out of a durable, flexible polyurethane plastic material such as ELASTOLLAN TM S98A available from Elastogran of Germany. The release tool generally comprises a cylindrical body with a slot along its length and a flange on one end. The slot permits the tool to be positioned around a port to which a garter spring coupling is connected; the flange provides an area for gripping the tool to releasably engage the tool with its coupling.

The diameter of the cylindrical body is selected to closely fit about a tubular port to which a garter spring coupler is connected. Commonly, such ports come in four sizes, namely: ⅜, ½, ⅝ and ¾ inch diameters. Accordingly, it is desirable to maintain a complete four-piece tool set, one for each common size port.

The flexible, slotted configuration of the garter spring coupling release tool permits nesting of a four-piece set of such tools within each other to facilitate packaging, storage and retention of the tools as a set. Preferably, the flange of each tool is provided with an aperture so that the set of tools may be loosely connected via a cord or the like to maintain the set of tools together and complete.

It is an object of the present invention to provide a low cost, easily manufactured garter spring coupling release tool.

It is a further object of the present invention to provide a configuration of such tools to facilitate the sale, maintenance and storage of such tools in a set of common sizes of such tools.

Other objects and advantages of the present invention will become apparent from the following description of a presently preferred embodiment.

BRIEF DESCRIPTION OF THE DRAWINGS

FIG. 1 is a perspective view of a garter spring coupling release tool made in accordance with the teachings of the present invention.

FIG. 2 is a bottom view of the tool shown in FIG. 1;

FIG. 3 is a top view of the tool shown in FIG. 1;

FIG. 4 is a side view of the left side of the tool shown in FIG. 1, the right side of the tool being the mirror image thereof;

DETAILED DESCRIPTION OF A PREFERRED EMBODIMENT

Figure 5:
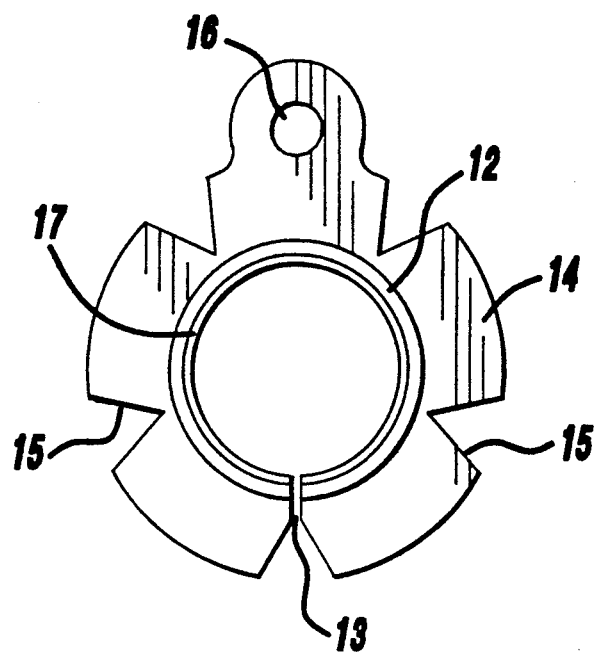
FIG. 5 is a front view of the tool shown in FIG. 1.
Figure 6:
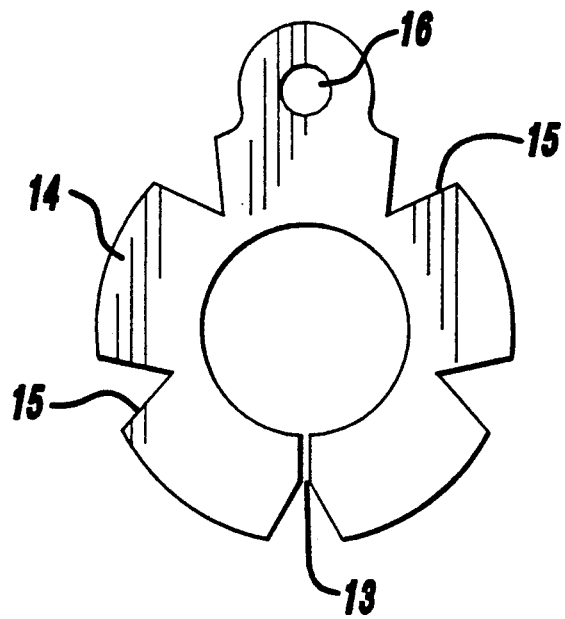
FIG. 6 is a back view of the tool shown in FIG. 1.

Referring to FIGS. 1-6, there is shown a one-piece garter spring coupling release tool 10. The tool has a cylindrical body 12 which contains an axial slot 13 along the length thereof. A flange 14 is molded on one end of the cylindrical body 12. The flange includes a series of "V" slots 15 and an aperture 16. The opposite end of the cylindrical body 12 is provided within an interior bevel 17 and an exterior groove 18.

The tool is preferably made in a single molding operation from a sturdy, flexible polyurethane material such as ELASTOLLAN TM S98A. The size of the cylindrical body is selected to conform to the circumferential size of the port associated with the garter spring coupling to be disconnected. Typically, such ports are ⅜, ½, ⅝, or ¾ inches in internal diameter.

The thickness of the operative end of the cylindrical body 12 is sufficient to enable a garter spring of a garter spring coupling to be radially outwardly biased from the associated tubular port to clear the ports' flared end as discussed in more detail below. Accordingly, the thickness of the cylindrical body is typically 0.078 inches.

Figure 7:
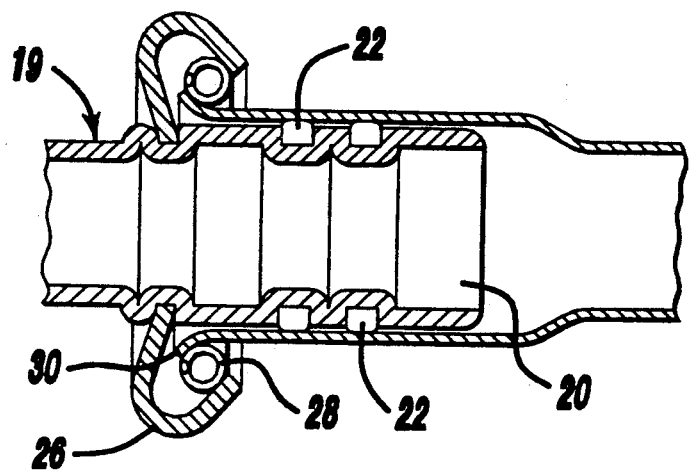
FIG. 7 is a sectional view of a conventional garter spring coupling engaged with an associated port.
Figure 8:
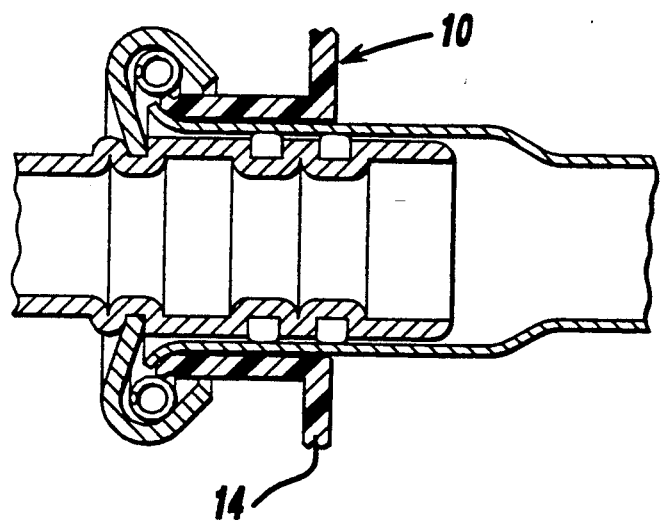
FIG. 8 is a sectional view of the garter spring coupling shown in FIG. 9 wherein the garter spring coupling release tool is releasably engaged with the garter spring to permit disconnection of the coupling.

As can be seen in FIGS. 7 and 8, a typical garter spring coupling 19 comprises a tubular member 20 having associated "O" rings 22 which is telescopically received within a tubular port 24. The coupling 19 includes an annular cage 26 which houses and retains a garter spring 28 associated with the coupling 19. The garter spring 28 retains coupling 19 engaged within tubular port 24 through engagement with a flared end 30 of port 24 and the angular cage 26 of the coupling 19.

To release the garter spring coupling 19, the cylindrical body 12 of the tool 10 is positioned about the tubular port 24 in front of the coupling 19. The longitudinal slot 13 and "V" slots 15 of the tool 10 enable the tool to be opened and positioned around the tubular port 24. Thereafter, the flange 14 is grasped by the user to axially displace the tool along the tubular port 24 towards the coupling 19. The axial displacement of the tool 10 forces the operative end of the tool 10 between the flared end 30 of the tubular port 24 and the garter spring 28 of the coupling 19 as shown in FIG. 8. The interior bevel 17 and groove 18 on the end of the cylindrical tool 10 facilitates the engagement of the flared port end 30 to radially expand the garter spring 28 to clear the flared end 30 thereby permitting the garter spring coupling 19 to be disconnected. The tool 10 is then removed from the port 24 by again spreading the cylindrical tool 10 along its axial slot 13.

Garter spring couplings are in widespread use in automobiles. In order to be prepared to service automobiles having such couplings, it is desirable to have a set of four garter spring coupling release tools to be used, respectively, with the four prevalent sizes of such coupling. The configuration of the tool of the present invention is particularly suited for providing such a set of tools.

Figure 9:
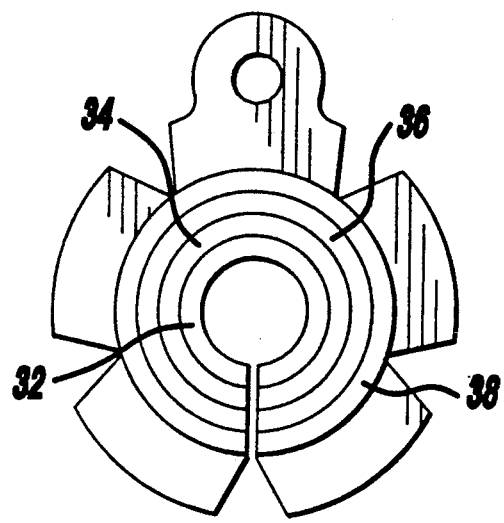
FIG. 9 is a front view of a set of four different sized tools of the type shown in FIG. 1 nested within each other.
Figure 10:
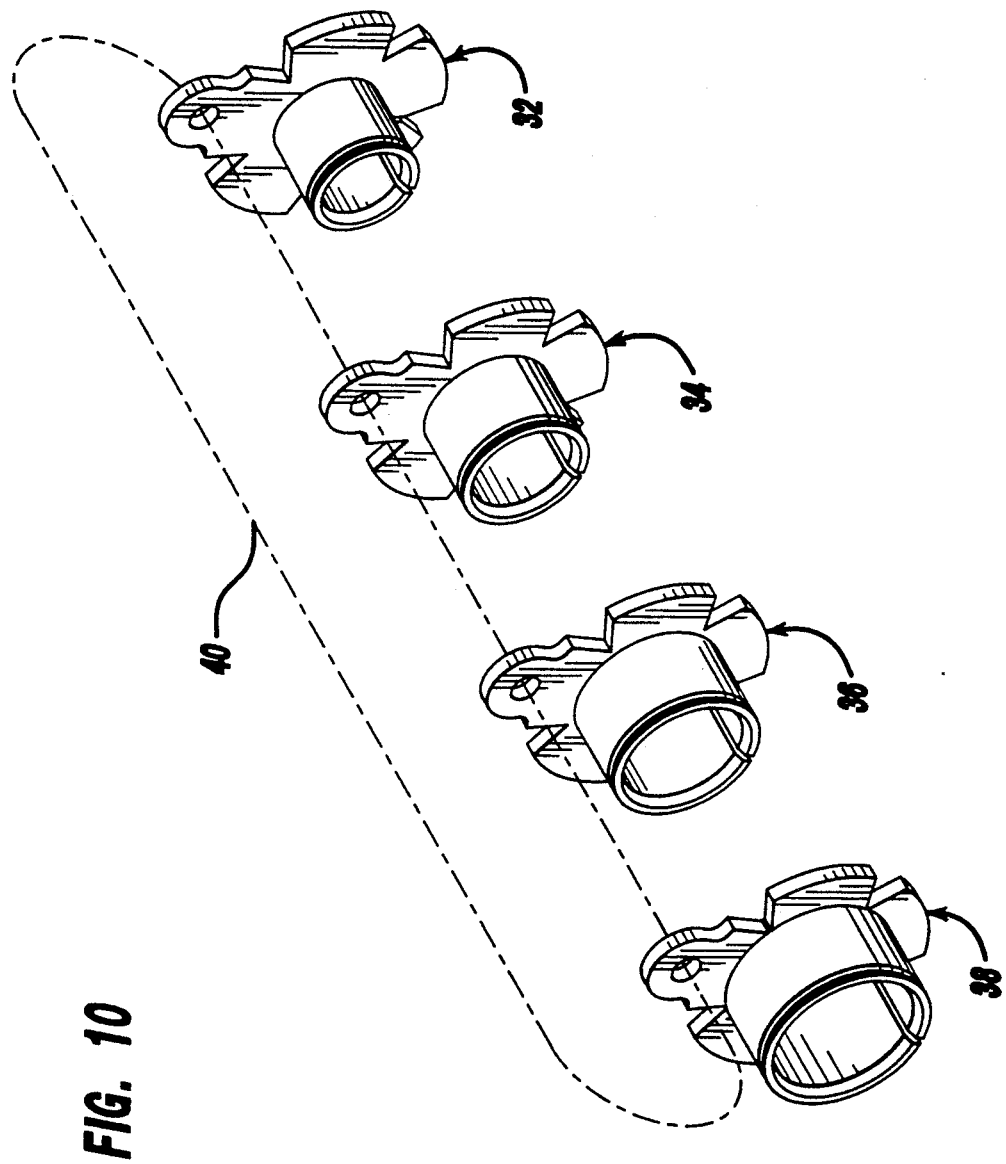
FIG. 10 is a perspective view of a set of four different sized tools of the type shown in FIG. 1 with a connecting cord shown in phantom.

As can be seen from FIG. 9 and 10, the flexible cylindrical construction of the release tool enables a set of four tools 32, 34, 36, 38 of graduated size to be nested within each other. This provides for efficient association of a set of four release tools adapted for the four common sizes of garter spring couplings.

Preferably, the flange diameter and location of the flange aperture 16 for each tool 32, 34, 36, 38 is substantially the same. As shown in FIG. 10, a cord 40 or the like can be threaded through the aperture 16 of each tool to maintain the set of four tools together when they are not nested within each other.

We claim:

1. A release tool for disconnecting a coupling from a tubular port having a flared end engaged by a garter spring of the coupling, said tool comprising a unitary selectively sized cylindrical body having first and second ends and an axial slot extending from end to end, said tool being made of a flexible material to permit the cylindrical body to be opened along said axial slot for positioning the tool about the tubular port to which the garter spring coupling is connected, the first end of said body having a flange for gripping the tool during use wherein said flange has a plurality of "V" slots for facilitating the opening of said tool along said axial slot, said cylindrical body from said flange to adjacent said second end having a constant thickness therearound, and the second end of said cylindrical body having a thickness sufficient to radially displace the garter spring from engagement with the tubular port to clear the flared end of the port thereby permitting the coupling to be disconnected from the port.

2. A set of release tools in accordance with claim 1 wherein the cylindrical body of each tool of said set has a different diameter such that said tools are nestable within each other.

3. A set of release tools according to claim 2 wherein the set comprises four tools selectively sized to release garter spring couplings from tubular ports of ⅜, ½, ⅝ and ¾ inch sizes, respectively.

4. A set of release tools according to claim 2 wherein the flange of each said tool includes an aperture for maintaining the set of tools together through the use of cord means threaded through the apertures of said tools.

5. A release tool for disconnecting a coupling from a tubular port having a flared end engaged by a garter spring of the coupling, said tool comprising a unitary selectively sized cylindrical body having first and second ends and an axial slot extending from end to end, said tool being made of a flexible material to permit the cylindrical body to be opened along said axial slot for positioning the tool about the tubular port to which the garter spring coupling is connected, the first end of said body having a flange for gripping the tool during use wherein said flange has at least one "V" slot for facilitating the opening of said tool along said axial slot, said cylindrical body from said flange to adjacent said second end having a constant thickness therearound and the second end of said cylindrical body having a thickness sufficient to radially displace the garter spring from engagement with the tubular port to clear the flared end of the port, an interior bevel and an exterior circumferential groove spaced inward from and cooperating with the bevel to facilitate outward radial displacement of the garter spring thereby permitting the coupling to be disconnected from the port.

* * * * *